United States Patent Office 2,889,580
Patented June 9, 1959

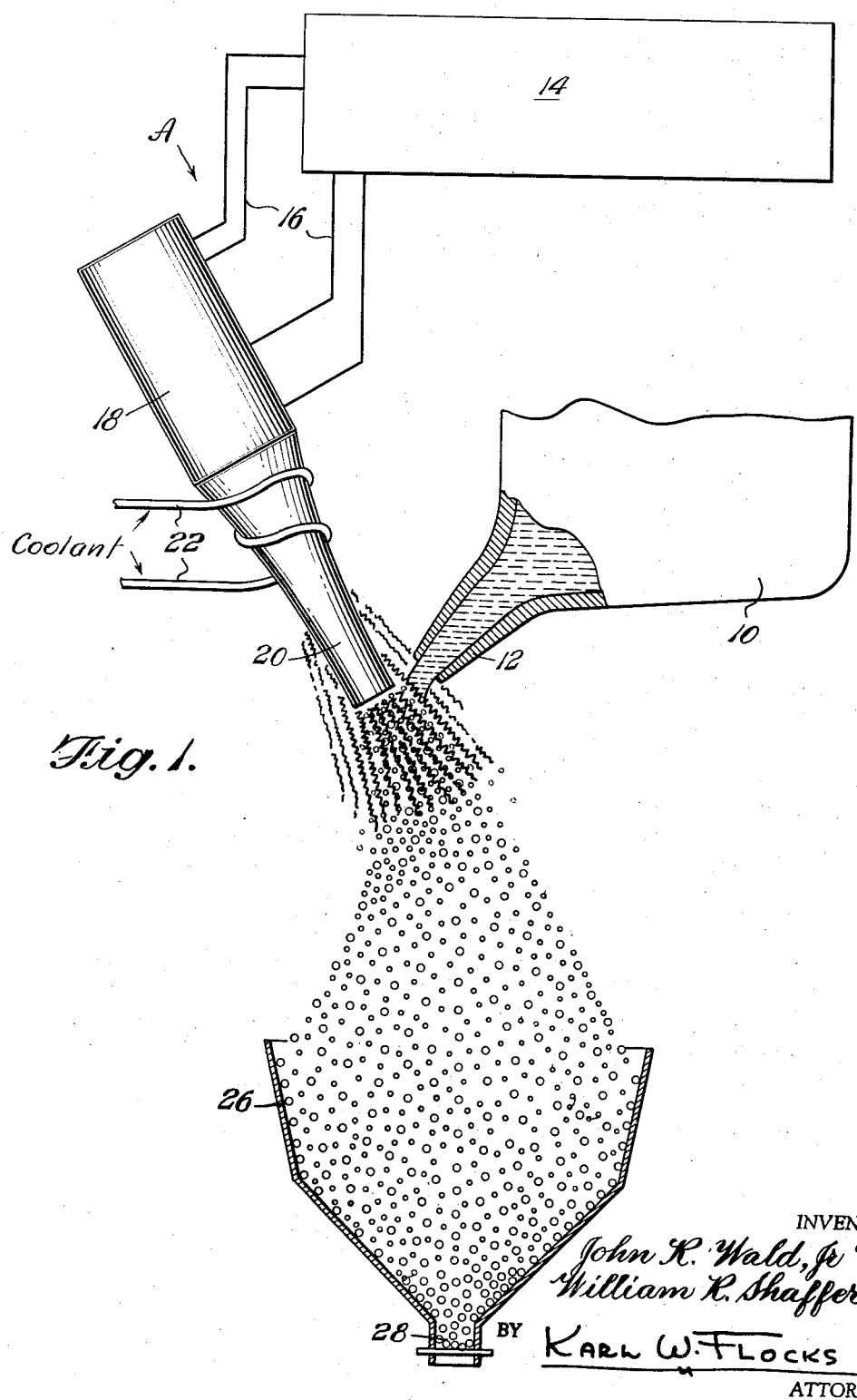

2,889,580

MANUFACTURE OF SPHERICAL PARTICLES

John R. Wald, Jr., and William R. Shaffer, Huntingdon, Pa., assignors to Wald Industries, Inc., Huntingdon, Pa., a corporation of Pennsylvania Application November 8, 1956, Serial No. 621,063

2 Claims. (Cl. 18—47.2)

This invention relates to the manufacture of beads, and more particularly to a method and apparatus for the manufacture of small spherical glass beads.

The present invention is particularly applicable to the production of small glass beads useful in the manufacture of reflecting motion picture screens, reflecting road signs and markers, reflecting advertising signs, and in reflecting highway marking paint. In such usage, it is the practice to embed glass spheres of small diameter in a suitable binder so that the spheres, backed by the binder material, act as reflectors for light projected thereagainst. It is desirable that the glass beads be substantially spherical, as in most cases irregular and non-spherical beads or broken glass particles would cause diffraction of the light rays to such an extent as to partially destroy the reflecting effect from the device.

The production of small diameter glass beads of substantially uniform size and substantially true spheres, however, presents pronounced manufacturing difficulties. It has long been known that a molten material, such as glass or a metal, when dropped from a height, will take on a spherical shape. This fact has been made use of in the manufacture of large sizes of glass beads. When, however, attempts are made to drop molten glass in sufficiently small droplets to produce small diameter beads, the results are unsatisfactory because it is difficult to get a droplet of uniform size and small enough to produce such small diameter beads, and in many instances such particles adhere together and produce small clusters instead of beads.

It heretofore also has been proposed to prepare glass beads below .050 inch by crushing glass of the proper chemical composition such that a range of sizes of irregular glass particles result. These particles are screened into size ranges. The pulverized glass is then subjected to the influence of heat while in motion by dropping the pulverized glass, in a stream, into the path of a more or less horizontal jet of burning gas to fuse the individual particles of powdered glass. The resulting product contained some spherically shaped particles, but also contained substantial amounts of irregularly shaped particles, and of aggregated particles, superficially fused together. In cases where regularity of shape and uniformity of size of the resulting particles is an important consideration, such products are objectionable, since the task of separating the irregularly shaped from the regularly shaped particles is not commercially feasible.

A large percentage of the total work in the above process deals with the production of the proper sized crushed glass particles. This operation is not only expensive, but considerable care must be exercised to prevent fine glass dust from contaminating the air and becoming a hazard to the workers' health.

It is therefore an object of the present invention to provide an improved process and apparatus for manufacturing small glass spheres which eliminates the difficulties heretofore mentioned.

It is a further object of the present invention to produce spherical glass beads directly from molten glass that are under .050 inch in diameter and of uniform size.

It is a still further object of the present invention to provide an improved process and apparatus for manufacturing small glass spheres directly from molten glass that yield a more uniform range of sizes of beads than can be obtained from the methods utilizing crushed glass particles.

Other objects and advantages of the invention will be apparent from the preferred form of the invention which is illustrated in the accompanying drawings, in which:

Fig. 1 is a diagrammatic lay-out showing the process and apparatus used in the present invention.

Essentially, the present invention relates to a process and apparatus wherein very small glass spheres under .050 inch in diameter are produced directly from molten glass by the use of an ultrasonic generator. The glass spheres are formed by feeding the molten glass into proximity to the tip of the output horn of the generator where the ultrasonic waves form the glass into small uniform droplets, which cool while falling through air into spheres.

The apparatus for use in the manufacture of these spheres is illustrated diagrammatically in Fig. 1. A furnace 10 of any conventional type is used for melting glass or other material of the desired composition. The molten material may be discharged in a stream through the nozzle 12 at the lower portion of the furnace 10.

An ultrasonic generator represented by A may be of any conventional type and comprises the electrical circuit represented by 14 with conductors 16 leading to a transducer unit 18 which acts to convert the electrical output into mechanical energy. The ultrasonic waves generated are amplified by the transducer horn 20. A cooling coil 22 or other means for cooling the transducer is provided between the tip of the horn 20 and the transducer 18, so as to prevent excessive temperatures and to maintain the operating stability of the mechanism.

The molten material from the furnace 10 is discharged in a stream through the nozzle 12 into proximity to the tip of the transducer horn 20 where the ultrasonic waves emanating therefrom cause the molten material to form into small droplets. The surface tension of the molten material pulls the droplets into spherical shape after which they cool in the air as they fall into a collecting chamber 26.

The horn 20 is illustrated in a desirable shape, however, it should be understood that any other means may be employed for producing sound waves. The horn may be any type of connector between the transducer element and the glass stream. The horn may act as an amplifier or simply as a coupling device.

This process is an automatic and continuous one, wherein the furnace may be continually fed with the material to be melted, and the molten material can be continuously withdrawn in a stream through the nozzle 12 into proximity to the tip of the horn 20. The ultrasonic generator operates continuously to form the waves which in turn act on the stream to form droplets.

The coolant material flowing through the coolant coils 22 prevents the transducer from heating up due to the heat of the molten material at the tip of the horn 20. The spheres which are formed fall into the collecting chamber 26 and may be withdrawn from time to time through the discharge funnel 28.

The above-described process and apparatus represents a novel manner of forming small spheres directly from molten material and enables the simple and cheap production of small uniformly sized spheres. It is evident that the process according to the invention can be applied to any fusible pulverous material such as metal oxide, ceramic substances, carbon, silicates, clays, and the like, as well as glass and metal.

The process described heretofore can be used to produce spheres with diameters as low as 3 mils.

It will be obvious to those skilled in the art that various changes may be made without departing from the spirit of the invention and therefore the invention is not limited to what is shown in the drawings and described in the specification but only as indicated in the appended claims.

What is claimed is:

1. A process for forming small glass spheres under .050 inch in diameter which comprises melting the material from which the spheres are to be formed, passing a stream of the molten material into the field of ultrasonic waves of the output horn of an ultrasonic generator whereby a shower of small molten droplets is formed, and cooling said molten droplets until solidified into spherical shape while falling through a gaseous atmosphere.

2. A process for forming small glass spheres under .050 inch in diameter which comprises melting the material from which the spheres are to be formed, passing a stream of the molten material into a field of ultrasonic waves whereby a shower of small molten droplets is formed by action of the ultrasonic waves on the stream of molten material, and cooling said molten droplets until solidified into spherical shape while falling through a gaseous atmosphere.

References Cited in the file of this patent

UNITED STATES PATENTS

| | | |
|---|---|---|
| 2,334,578 | Potters | Nov. 16, 1943 |
| 2,398,455 | Unger | Apr. 16, 1946 |
| 2,488,353 | Unger | Nov. 15, 1948 |
| 2,510,574 | Greenhalgh | June 6, 1950 |
| 2,616,124 | Lyle | Nov. 4, 1952 |